(12) United States Patent
Kim et al.

(10) Patent No.: US 10,432,111 B2
(45) Date of Patent: Oct. 1, 2019

(54) SELF-REPAIRING ENERGY GENERATING ELEMENT USING SHAPE MEMORY POLYMER

(71) Applicant: Research & Business Foundation SUNGKYUNKWAN UNIVERSITY, Suwon-si (KR)

(72) Inventors: Sang-Woo Kim, Yongin-si (KR); Jeong Hwan Lee, Gumi-si (KR); Hey Jung Park, Seoul (KR); Keun Young Lee, Suwon-si (KR); Sang Hyun Kim, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 832 days.

(21) Appl. No.: 14/862,290

(22) Filed: Sep. 23, 2015

(65) Prior Publication Data

US 2016/0087552 A1 Mar. 24, 2016

(30) Foreign Application Priority Data

Sep. 23, 2014 (KR) .......................... 10-2014-0126618

(51) Int. Cl.
*H02N 1/04* (2006.01)
(52) U.S. Cl.
CPC ..................................... *H02N 1/04* (2013.01)

(58) Field of Classification Search
CPC ....................................................... H02N 1/04
See application file for complete search history.

(56) References Cited

U.S. PATENT DOCUMENTS

| 9,825,558 | B2 * | 11/2017 | Zhang | ...................... | H02N 1/04 |
| 2004/0228108 | A1 * | 11/2004 | Lee | ...................... | G02B 6/0055 |
|  |  |  |  |  | 362/627 |
| 2013/0049531 | A1 * | 2/2013 | Wang | ...................... | H02N 1/04 |
|  |  |  |  |  | 310/309 |
| 2015/0001993 | A1 * | 1/2015 | Park | ...................... | H01L 41/113 |
|  |  |  |  |  | 310/319 |
| 2015/0061460 | A1 * | 3/2015 | Bae | .......................... | H02N 1/04 |
|  |  |  |  |  | 310/310 |
| 2015/0061464 | A1 * | 3/2015 | Park | ...................... | H01L 41/113 |
|  |  |  |  |  | 310/329 |

FOREIGN PATENT DOCUMENTS

| WO | WO 2013152695 A1 * | 10/2013 | ............... H02N 1/04 |
| WO | WO 2013170651 A1 * | 11/2013 | ............... H02N 1/04 |
| WO | WO 2014005434 A1 * | 1/2014 | ............... H02N 1/04 |

\* cited by examiner

*Primary Examiner* — Mohamad Musleh
(74) *Attorney, Agent, or Firm* — NSIP Law

(57) ABSTRACT

Provided is a self-repairing energy generating element using a shape memory polymer, including a first electrode; a shape memory friction layer made of the shape memory polymer on the first electrode and having a microbump pattern formed on a surface thereof; a second electrode disposed apart from the shape memory friction layer; and an opposing layer formed on the second electrode and configured to face the shape memory friction layer.

14 Claims, 3 Drawing Sheets

SELF-REPAIRING ENERGY GENERATING ELEMENT USING SHAPE MEMORY POLYMER

CROSS-REFERENCE TO RELATED APPLICATIONS

This application claims the benefit under 35 USC § 119(a) of Korean Patent Application No. 10-2014-0126618 filed on Sep. 23, 2014 in the Korean Intellectual Property Office, the entire disclosure of which is incorporated herein by reference for all purposes.

BACKGROUND

1. Field of the Invention

The present invention relates to a self-repairing energy generating element using a shape memory polymer, and more particularly, to a self-repairing energy generating element that includes a shape memory polymer and generates electrical power by converting friction-induced static electricity into usable electricity.

2. Discussion of Related Art

Generally, energy generating elements that produce electrical power by converting static electricity into usable electricity include a friction member in order to generate static electricity through friction. As friction is induced by having a friction member in contact with or sliding it against another material, voltage is generated due to potential imbalance between the oppositely charged materials, thereby current is generated.

Electrical power that such energy generating elements can produce increases as the friction surface area increases, therefore a micropattern composed of a plurality of nano- or micro-scaled units is often formed on a surface of the friction member. However, as the friction member having such micropattern as described above is repeatedly contacted or slid, the micropattern tends to collapse, leading to a decrease in the efficiency of the energy generating elements.

In the energy generating elements, as a friction member, a polymer sheet composed of an organic material such as a polymer is used. Using a polymer sheet as a friction member has the advantage in that it is relatively easy to form a micropattern on its surface. However, the polymer sheet tends to suffer more easily and to a greater extent, chemical degradation due to light, moisture, etc., and mechanical degradation due to friction. Especially, when the surface of the polymer sheet is patterned with micro-scale structures, the surface suffers mechanical degradation to an even greater extent and the micropattern tends to collapse more easily compared to when the polymer sheet is not patterned with the micro-scaled structures.

SUMMARY OF THE INVENTION

To address these problems described above, the present invention is directed to providing a self-repairing energy generating element using a shape memory polymer, which prevents mechanical degradation thereby having a semi-permanent service life.

In an attempt to achieve the above objective, the present invention provides a self-repairing energy generating element using a shape memory polymer, including a first electrode; a shape memory friction layer made of a shape memory polymer on the first electrode and having a microbump pattern formed on a surface thereof; a second electrode disposed apart from the shape memory friction layer; and an opposing layer disposed on the second electrode configured to face the shape memory friction layer.

In one embodiment, in the case where the microbump pattern is deformed, the deformed microbump pattern may recover to its initial shape under application of light, heat, or chemical, mechanical or electric energy.

In one embodiment, the shape memory polymer may include a polyalkylene-based compound, a polyurethane-based compound, an epoxy-based compound or a polynorbornene-based compound. The shape memory friction layer may further include at least one filler selected from the group consisting of alumina, silica, silicon carbide, aluminum nitride, boron nitride, a carbon nanotube, iron oxide, graphite and a carbon nanofiber.

In one embodiment, the shape memory polymer may include a block copolymer.

In one embodiment, examples of the block copolymer may include a polyethylene terephthalate (PET)-polyethyleneoxide (PEO) copolymer, a polystyrene (PS)-poly(1,4-butadiene) block copolymer and an ABA tri-block copolymer prepared from poly(2-methyl-2-oxazoline) and polytetrahydrofuran.

In one embodiment, a protrusive unit of the microbump pattern may be in the shape of a pyramid, a cylinder, a cube or a semi-sphere.

In one embodiment, the self-repairing energy generating element may further include a spacer that spaces the shape memory friction layer apart from the opposing layer.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Example embodiments of the present invention will be described in detail below with reference to the accompanying drawings. While the present invention is shown and described in connection with example embodiments thereof, it will be apparent to those skilled in the art that various modifications can be made without departing from the spirit and scope of the invention.

It will also be understood that when a layer is referred to as being "on" another layer or substrate, it can be directly on the other layer or substrate, or intervening layers may also be present. Whereas, when a layer is referred to as being "directly on" or "connected to" another layer or substrate, there cannot be intervening layers in-between. Although the designations such as "first" and "second" are used to describe various elements, compositions, regions, layers and/or parts, it is intended only to differentiate one element or layer from another, hence such designation does not imply any sort of order or priority of importance, nor limit the individual items thusly designated.

It should be noted that all technical terms used herein are used in order to improve the understanding of the present invention, and therefore are not to be interpreted as limiting the scope of the invention. Also, unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention will be further outlined in reference to schematic and perspective views. However, specific functional details disclosed herein are merely representative for purposes of describing example embodiments. Example embodiments may, however, be embodied in many alternate forms and should not be construed as limited to only the embodiments set forth herein. Therefore, it should be understood that the description of embodiments are intended for purposes of illustration only and are not intended to limit the scope of the present invention. The drawings, figures and views are not necessarily drawn to scale, and it should be understood that embodiments of the present invention are not to be defined by the drawings, figures and views disclosed herein as they should not be interpreted as limiting the scope of the present invention.

Figure 1:
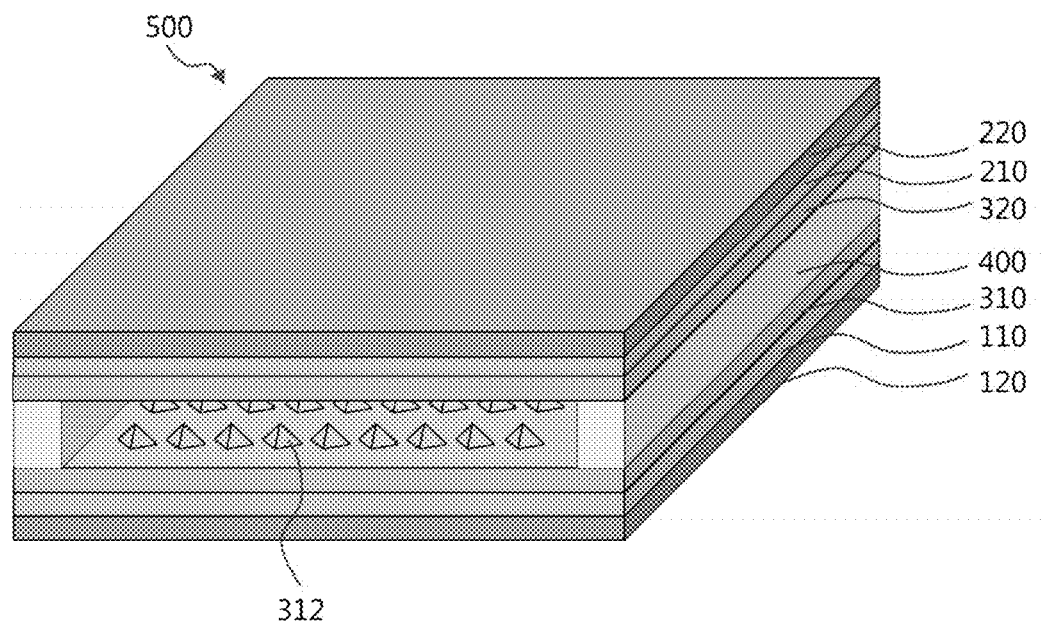
FIG. 1 is a perspective view illustrating a self-repairing energy generating element using a shape memory polymer according to an embodiment of the present invention.

FIG. 1 is a perspective view of a self-repairing energy generating element using a shape memory polymer according to an embodiment of the present invention.

Referring to FIG. 1, the self-repairing energy generating element 500 using a shape memory polymer includes two electrodes 110 and 210 facing each other, a shape memory friction layer 310, an opposing layer 320 and a spacer 400. The self-repairing energy generating element 500 may further include the substrates 120 and 220, each of which supports the electrodes 110 and 210 respectively.

The first electrode 110 is disposed on the first substrate 120, the second electrode 210 is disposed on the second substrate 220. The first substrate 120 and the second substrate 220 are spaced apart from each other by the spacer 400, the shape memory friction layer 310 is disposed on the first electrode 110.

The first and second substrates 120 and 220 may be in the form of, for example, a film, sheet or substrate. The first and second substrates 120 and 220 may be a film, sheet or substrate composed of materials that are flexible or bendable by external stress induced by human, machine, wind or sound-induced vibration, etc. The first and second substrates 120 and 220 act as a support for the first and second electrodes 110 and 210 respectively, and also protect them from external environments. The first and second substrates 120 and 220 may have flexibility and/or elasticity, and there is no particular limitation on the kind of material to form the substrates. For example, the first and second substrates 120 and 220 may be composed of plastics, paper, glass or sapphire. Alternatively, the first and second substrates 120 and 220 may be composed of materials such as polyethylene terephthalate (PET) and polyether sulfone (PES).

The first and second electrodes 110 and 210 are connected electrically. For example, the first electrode 110 and the second electrode 210 may be connected electrically by wires. The first and second electrodes 110 and 210 may be composed of a conductive material. Examples of materials for the first and second electrodes 110, 210 include gold (Au), platinum (Pt), palladium (Pd), palladium-gold alloy (Pd—Au alloy), nickel (Ni), nickel-gold alloy (Ni—Au alloy), ruthenium (Ru), silver (Ag), copper (Cu), zinc (Zn), titanium (Ti), titanium-gold alloy (Ti—Au alloy), aluminum (Al), indium tin oxide (ITO), fluorine-doped tin oxide (FTO), gallium zinc oxide (GZO), carbon nanotube (CNT) and graphene.

The shape memory friction layer 310 is disposed on the first electrode 110. The shape memory friction layer 310 is a friction member that slides against the opposing layer 320, and under no external stimuli, is disposed apart from the opposing layer 320. The opposing layer 320 is disposed on the second electrode 210, facing the shape memory friction layer 310. The opposing layer 320 is composed of a material that gets oppositely charged with respect to the shape memory friction layer 310, and there is no particular limitation on the kind of materials that can be used to form the opposing layer 320, so long as the properties of the material allow for the opposing layer 320 to get oppositely charged with respect to the shape memory friction layer 310 through friction.

The shape memory friction layer 310, on its surface, has a microbump pattern 312 of which a microbump unit protrudes towards the second electrode 210. Morphologically, the microbump unit of the microbump pattern 312 may be pyramidal as depicted in FIG. 1. The microbump pattern 312 can be formed by imprinting technique which uses a mold with an embossed intaglio pattern of the microbump pattern 312. Also, the microbump unit of the microbump pattern 312 may be formed in the shape of a cylinder, a cube or a semi-sphere but is not limited thereto. When the surfaces of the shape memory friction layer 310 and the opposing layer 320 are patterned with micro-scale structures, their friction surface area becomes much greater.

The shape memory friction layer 310 has an ability to remember its initial shape, therefore in the case of the morphological deformation due to external stress, the initial shape can be restored upon application of light, heat, or chemical, mechanical or electric energy; this ability is called a shape memory effect. For example, if the microbump pattern 312 is deformed by external stress, by applying heat to the deformed microbump pattern and cooling it, the microbump pattern 312 can recover its initial shape. As used herein in reference to the morphology of the microbump unit and microbump pattern, the term "initial" shape or form, i.e., As-grown shown in FIG. 2(b), refers to the initial shape into which the microbump pattern 312 is programmed, the term "deform" or "deformation" used herein refers to the state of the microbump pattern 312 that has changed, in a way that differs from its initial shape due to repeated use of the self-repairing energy generating element 500, and the term a "shape memory polymer" used herein refers to a polymer with a shape memory effect that constitutes the shape memory friction layer 310. Owing to the ease with which the microbump pattern 312 can recover its initial shape upon application of external energy in the case of deformation, the microbump pattern 312 can be used semi-permanently without causing critical deterioration in the properties of the self-repairing energy generating element 500.

In one embodiment, the shape memory friction layer 310 is heated above the triggered temperature. This triggered temperature can be the glass transition temperature ($T_g$) or melting point ($T_m$) of the shape memory polymer that constitutes the shape memory friction layer 310. When the shape memory polymer is heated above the triggered temperature, the molecular chains of the shape memory polymer rearranges themselves, and by cooling it rapidly at this point, the state of the shape memory friction layer 310 can be restored to the initial state. A triggered temperature varies depending on the specific kind of a shape memory polymer, and the present invention does not place any particular limitation on the kind of a shape memory polymer to be used.

For example, the shape memory polymer may include a polymer, and examples of the polymer include a polyalkylene-based compound such as polyethylene and polypropylene; a polyurethane-based compound; an epoxy-based compound; and a polynorbornene-based compound. Also, the shape memory polymer may further include a filler blended with a polymer listed above. The shape memory friction layer 310 may have a structure wherein the polymer forms a matrix and the filler is deposited inside the matrix. Examples of the filler include alumina, silica, silicon carbide, aluminum nitride, boron nitride, a carbon nanotube, iron oxide, graphite and a carbon nanofiber.

Furthermore, the shape memory polymer may include a block copolymer. Examples of the block copolymer include a polyethylene terephthalate (PET)-polyethyleneoxide (PEO) block copolymer, a polystyrene (PS)-poly(1,4-butadiene) block copolymer and an ABA tri-block copolymer prepared from poly(2-methyl-2-oxazoline) and polytetrahydrofuran.

The shape memory friction layer 310 can be prepared by using a mold with an embossed intaglio pattern of the microbump pattern 312, and forming a shape memory friction layer by the imprinting technique using the mold, transcribing the pattern onto the first electrode 110. Alternatively, the shape memory friction layer 310 can also be prepared by first coating the surface of the first electrode 110 with a layer composed of a shape memory polymer and directly imprinting the pattern onto the layer by using the mold. The shape memory friction layer 310 may be prepared by any one of known techniques in the art.

The spacer 400 is disposed between the shape memory friction layer 310 and the opposing layer 320. By the spacer 400, the first substrate 120 and the second substrate 220 can be spaced apart from each other and the shape memory friction layer 310 and the opposing layer 320 can remain disposed apart from each other in the absence of external stimuli. The spacer 400 is composed of a non-conductive material; therefore electrons cannot flow when the shape memory friction layer 310 and the opposing layer 320 are spaced apart from each other.

The spacer 400 is disposed between the shape memory friction layer 310 and the opposing layer 320 in a region at or near the edge of the self-repairing energy generating element 500. As depicted in FIG. 1, a pair of the spacer 400 is facing each other, disposed on each side of the self-repairing energy generating element 500. The spacer 400 may be in the shape of a bar with the same length as the side of the self-repairing energy generating element 500. Alternatively, although not illustrated in a Figure, the spacer 400 may be a structural unit in the shape of, for example, a cylinder or a cube, and disposed in a pillar-like fashion at or near each corner of the self-repairing energy generating element 500, in a set of four or more.

If a shape memory polymer constituting the shape memory friction layer 310 is a kind of polymer that gets positively charged through friction with the opposing layer 320 by donating electrons to the opposing layer 320 as the shape memory friction layer 310 comes in contact with the opposing layer 320 by external force, electrons in the shape memory friction layer 310 flow to the opposing layer 320 and/or the second electrode 210. Further, when the opposing layer 320 and the shape memory friction layer 310 are spaced apart, the shape memory friction layer 310 remains positively charged, and electrons that flowed from the shape memory friction layer 310 to the opposing layer 320 and/or the second electrode 210 further flow to the first electrode 110 through the wires, thereby producing electric energy. Then again, as the positively charged shape memory friction layer 310 comes in contact with the opposing layer 320, electrons in the first electrode 110 flow to the second electrode 210, thereby producing electric energy. By repeating the above process, the self-repairing energy generating element 500 can produce electric energy by using friction-induced static electricity.

On the other hand, if a shape memory polymer constituting the shape memory friction layer 310 is a kind of polymer that gets negatively charged through friction with the opposing layer 320 by capturing electrons from the opposing layer 320, as the opposing layer 320 comes in contact with the shape memory friction layer 310 by external force, electrons in the opposing layer 320 flow to the shape memory friction layer 310. Then, when the opposing layer 320 and the shape memory friction layer 310 are spaced apart, the shape memory friction layer 310 remains negatively charged, electrons in the first electrode 110 flow to the second electrode 210 through the wires so as to compensate for the electron deficiency of the shape memory friction layer 310, thereby producing electric energy. Then, as the negatively charged shape memory friction layer 310 comes in contact with the opposing layer 320, electrons in the opposing layer 320 flow to the first electrode 110 by the repulsive force, thereby producing electric energy. By repeating the above process, the self-repairing energy generating element 500 can produce electric energy by using friction-induced static electricity.

The process described above is repeated as the self-repairing energy generating element 500 is being used, and repeated frictional contact between the shape memory friction layer 310 and the opposing layer 320, results in mechanical degradation of the shape memory friction layer 310. That is, upon using the self-repairing energy generating element 500 for an extended period of time, the microbump pattern 312 collapses, deforming its morphology. Deformation of the microbump pattern 312 leads to a decrease in the friction surface area, leading to degradation in the performance of the self-repairing energy generating element 500. However, because the self-repairing energy generating element 500 of the present invention incorporates the shape memory friction layer 310 composed of a shape memory polymer, as a friction member, the microbump pattern 312 can readily recover the initial state through application of external energy such as light, heat, or chemical, mechanical or electric energy, and for example, through heating and cooling. Therefore, as the microbump pattern 312 undergoes the morphological recovery, the self-repairing energy generating element 500 can be regenerated to its initial efficiency. Thus, the performance of the self-repairing energy generating element 500 can be restored to its initial efficiency upon application of external energy whenever its performance starts to degrade, the self-repairing energy generating element 500 can have a semi-permanent service life without having a critical degradation or deterioration in its properties and performance.

Figure 2:
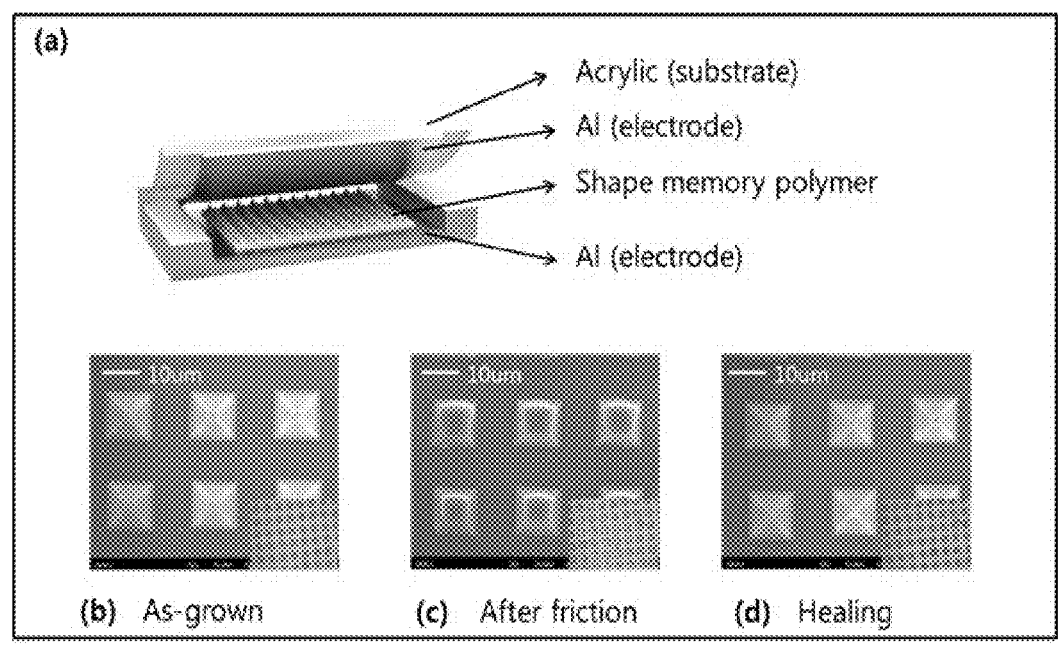
FIG. 2 is a series of photographs showing the initial, deformed and recovered states of a shape memory friction layer.

FIG. 2 is a series of photographs showing the initial, deformed and recovered states of the shape memory friction layer.

In FIG. 2, (a) is a view showing self-repairing energy generating element in FIG. 1, (b) is a plan-view photograph showing the initial pyramidal shape of the microbump pattern formed on the shape memory friction layer, (c) is a plan-view photograph showing the microbump pattern deformed by external stress, and (d) is a plan-view photograph showing the shape memory friction layer from (c), after heating and cooling. The shape memory friction layer shown in FIG. 2 (b), was prepared by the imprinting method, involving; the shape memory polymer is imprinted using a silicone mold with an embossed intaglio pattern of the pyramidal pattern, and then is heated in an oven at about 70° C. for about 1 hour, at which point the shape memory polymer is fixed ('programmed') into this pyramidal shape. The shape memory polymer used herein is MP-5510 (purchased from SMP technologies, Japan).

Referring to (b), (c) and (e) in FIG. 2, even when the initial pyramidal shape of the microbump pattern is deformed as shown in (c), it was shown that a treatment as facile as heating and cooling is sufficient to recover the deformed microbump pattern to the shape practically identical to the initial shape as shown in (d).

Manufacture of the Energy Generating Element and Effects Due to Friction

Using the shape memory friction layer depicted in FIG. 2, an energy generating element that has a structure practically identical to the one depicted in FIG. 1 was manufactured. Friction was induced by applying an external stress to the energy generating element described above, and the output voltage and current generated by the friction were measured while the morphology of the microbump pattern was monitored by scanning electron microscopy (SEM). Each external stress of different intensities was applied for 5 minutes, and the output voltage was measured for 20 seconds. The results are depicted in FIG. 3 to FIG. 5.

Figure 3:
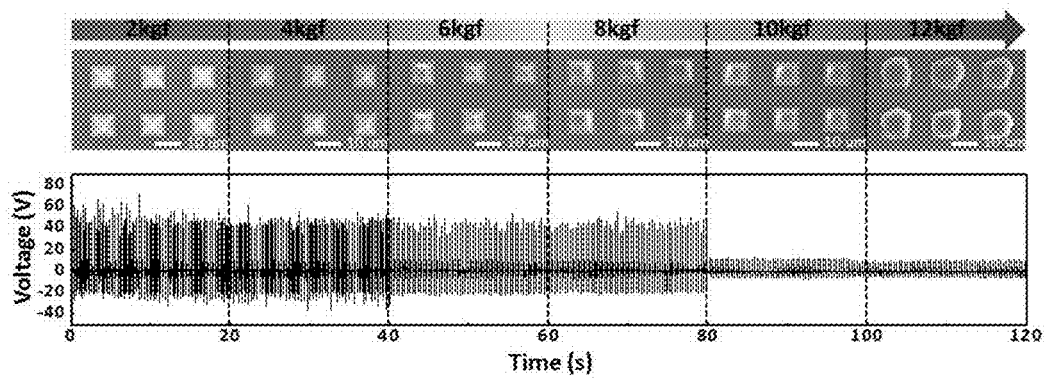
FIG. 3 illustrates a graph of the output voltage and the morphological change of the shape memory friction layer of the self-repairing energy generating element as a function of time under different external stress intensities.

FIG. 3 illustrates morphological changes of the shape memory friction layer and changes in the output voltage of the self-repairing energy generating element of the present invention, in response to increasing external stress. FIG. 4 is a graph showing changes in the output voltage of the self-repairing energy generating element of the present invention as a function of time, under external stress of different intensities.

Referring to FIG. 3, it was observed that the morphology of the microbump pattern changes with increasing external pressure at 2 kgf, 4 kgf, 6 kgf, 8 kgf and 12 kgf. Specifically, there were no remarkable morphological change of the microbump pattern under the external pressure of around 2 kgf to 4 kgf, but it was observed that under the external pressure of 6 kgf and greater, the peak of the protrusive microbump unit began to collapse, and also a change in the output voltage was observed upon the morphological change of the microbump pattern.

Figure 4:
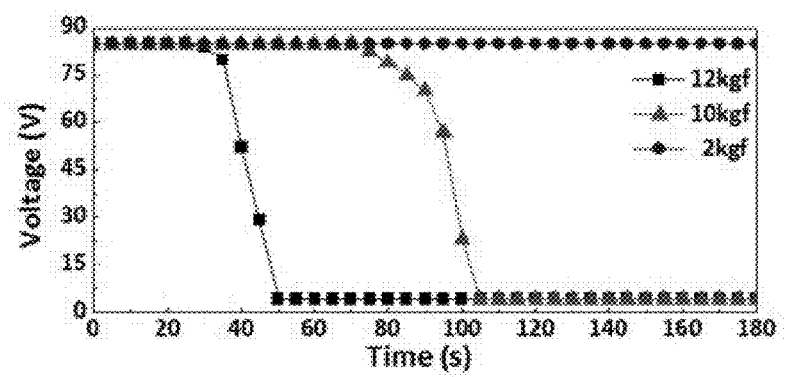
FIG. 4 is a graph showing the output voltage of the shape memory friction layer of the self-repairing energy generating element of the present invention as a function of time under different external stress intensities.
Figure 5:
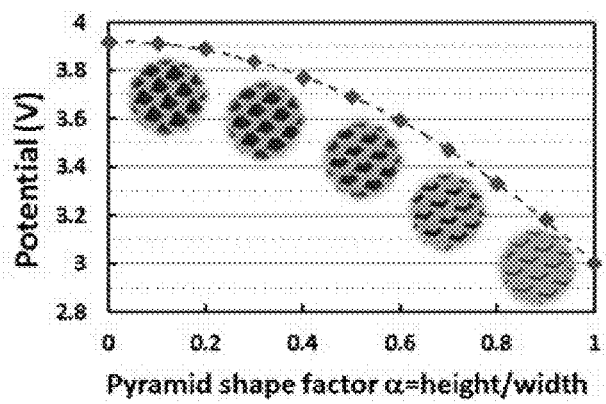
FIG. 5 is a graph showing the change in electric potential output with respect to morphological states of the microbump pattern of the shape memory friction layer of the self-repairing energy generating element of the present invention.

Particularly, in reference to FIG. 4 and FIG. 3 together, under the external pressure of around 2 kgf, there was no remarkable change observed in the morphology of the microbump pattern or in the output voltage over time. However, a drastic decrease in the output voltage was observed after 80 seconds under the external pressure of 10 kgf, and a similar drastic decrease in the output voltage was observed after 40 seconds under 12 kgf.

Based on the results in FIG. 2 to FIG. 4, the ratio of height to width of an individual unit of the microbump pattern is calculated as pyramid shape factor α (α=height/width) and the results are shown in FIG. 5. In FIG. 5, the x-axis represents the value of pyramid shape factor α, and the y-axis represents the value of electric potential (unit: volt).

FIG. 5 is a graph showing changes in the electric potential of the self-repairing energy generating element of the present invention, with respect to the morphology of the microbump pattern of the shape memory friction layer.

Referring to FIG. 5, it was shown that the electric potential decreases in response to morphological changes of the microbump pattern, which is in other words, morphological change of the shape memory friction layer. Therefore, it could be confirmed that degradation of the performance of the energy generating element depends on the morphological change of the shape memory friction layer. To overcome degradation of this kind, the present invention proposes the use of a shape memory friction layer, which allows for restoring the efficiency of the energy generating element by application of an external energy. Hereinafter, an experiment on thermal recovery of the energy generating element will be discussed and the results shown.

Evaluation of the Properties of the Thermally-Recovered Energy Generating Element As shown in FIG. 2 to FIG. 5, when the morphological deformation was confirmed by a drastic decrease in the output voltage and output current, the energy generating element was heated and cooled, and then the friction was induced and the output voltage was measured again. The results are shown in FIG. 6.

Figure 6:
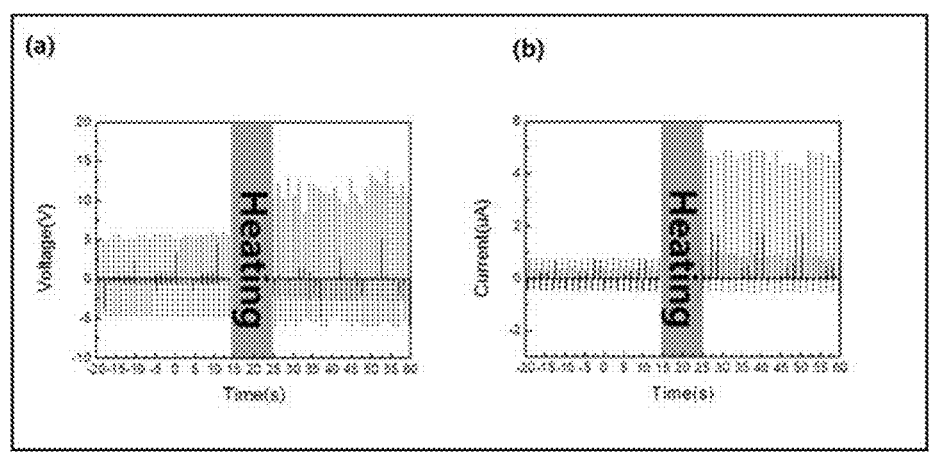
FIG. 6 is a graph showing the enhancing effect that heating has over the efficiency of the energy generating element.

FIG. 6 is a graph showing an enhancing effect that heating has over the efficiency of the energy generating element.

In FIG. 6, (a) is a graph showing time versus changes in the output voltage and (b) is a graph showing time versus changes in the output current, after the external stress of 12 kgf is applied to the energy generating element. In FIG. 6, "Heating" denotes a process in which the energy generating element was heated and after 10 seconds cooled down to room temperature.

Referring to (a) and (b) in FIG. 6, the output voltage markedly dropped from the levels above 60 V down to around 5 V under the external stress of 12 kgf. And although the output voltage was not as high as before, after heating and cooling, the output voltage improved noticeably compared to the output voltage of when degraded under 12 kgf. And herein, not only the output voltage, but also the output current improved.

Referring to what is discussed through FIG. 2 to FIG. 6, by using the shape memory friction layer composed of a shape memory polymer, even when the microbump pattern collapses upon repeated use of the energy generating element for an extended period of time, the microbump pattern can be readily restored to the initial shape by elevating the temperature. Thus, the efficiency of the self-repairing energy generating element can be restored to the initial efficiency. As such, the self-repairing energy generating element described above can be used semi-permanently, minimizing a decrease in its efficiency.

According to the above-described self-repairing energy generating element using a shape memory polymer, a shape memory friction layer composed of a shape memory polymer is used as a friction member of the self-repairing energy generating element. So even when the microbump pattern collapses over repeated use for an extended period of time, the microbump pattern can restore itself to the initial shape upon application of light, heat, chemical, mechanical or electric energy and as a result, the efficiency of the self-repairing energy generating element can be restored as well. Thus, the self-repairing energy generating element described above can be used semi-permanently, minimizing the decrease in its efficiency.

It will be apparent to those skilled in the art that various modifications can be made to the above-described exemplary embodiments of the present invention without departing from the spirit or scope of the invention. Thus, it is intended that the present invention covers all such modifications, provided that they come within the scope of the appended claims and their equivalents.

What is claimed is:

1. A self-repairing energy generating element using a shape memory polymer, comprising:
    a first electrode;
    a shape memory friction layer made of the shape memory polymer on the first electrode and having a microbump pattern formed on a surface thereof;
    a second electrode disposed apart from the shape memory friction layer; and
    an opposing friction layer formed on the second electrode and configured to face the shape memory friction layer,
    wherein, when a shape of the microbump pattern is deformed, the microbump pattern is restored to its initial shape by applying light, heat, or chemical or electric energy to the shape memory friction layer.

2. The self-repairing energy generating element of claim 1, wherein the shape memory polymer includes a polyalkylene-based compound, a polyurethane-based compound, an epoxy-based compound or a polynorbornene-based compound.

3. The self-repairing energy generating element of claim 2, wherein the shape memory friction layer further includes at least one filler selected from the group consisting of alumina, silica, silicon carbide, aluminum nitride, boron nitride, a carbon nanotube, iron oxide, graphite and a carbon nanofiber.

4. The self-repairing energy generating element of claim 1, wherein the shape memory polymer includes a block copolymer.

5. The self-repairing energy generating element of claim 4, wherein the block copolymer includes at least one selected from the group consisting of a polyethylene terephthalate (PET)-polyethyleneoxide (PEO) block copolymer, a polystyrene (PS)-poly(1,4-butadiene) block copolymer and an ABA tri-block copolymer prepared from poly(2-methyl-2-oxazoline) and polytetrahydrofuran.

6. The self-repairing energy generating element of claim 1, wherein the microbump pattern is in the shape of a pyramid, a cylinder, a cube or a semi-sphere.

7. The self-repairing energy generating element of claim 1, further comprising a spacer that spaces the shape memory friction layer apart from the opposing friction layer.

8. A self-repairing energy generating element using a shape memory polymer, comprising:
    an electrode; and
    a shape memory friction layer disposed on the electrode, the shape memory friction layer comprising:
        a shape memory polymer; and
        a microbump pattern disposed on a surface of the shape memory polymer,
    wherein, when a shape of the microbump pattern is deformed, the microbump pattern is restored to its initial shape by applying light, heat, or chemical or electric energy to the shape memory friction layer.

9. The self-repairing energy generating element of claim 8, wherein the shape memory polymer includes a polyalkylene-based compound, a polyurethane-based compound, an epoxy-based compound or a polynorbornene-based compound.

10. The self-repairing energy generating element of claim 9, wherein the shape memory friction layer further includes at least one filler selected from the group consisting of alumina, silica, silicon carbide, aluminum nitride, boron nitride, a carbon nanotube, iron oxide, graphite and a carbon nanofiber.

11. The self-repairing energy generating element of claim 8, wherein the shape memory polymer includes a block copolymer.

12. The self-repairing energy generating element of claim 11, wherein the block copolymer includes at least one selected from the group consisting of a polyethylene terephthalate (PET)-polyethyleneoxide (PEO) block copolymer, a polystyrene (PS)-poly(1,4-butadiene) block copolymer and an ABA tri-block copolymer prepared from poly(2-methyl-2-oxazoline) and polytetrahydrofuran.

13. The self-repairing energy generating element of claim 8, wherein the microbump pattern is in the shape of a pyramid, a cylinder, a cube or a semi-sphere.

14. The self-repairing energy generating element of claim 8, further comprising a spacer that spaces the shape memory friction layer apart from the opposing friction layer.

* * * * *